United States Patent
Suzuki

(10) Patent No.: US 10,221,738 B2
(45) Date of Patent: Mar. 5, 2019

(54) EXHAUST GAS PURIFICATION SYSTEM FOR INTERNAL COMBUSTION ENGINE

(71) Applicant: Toyota Jidosha Kabushiki Kaisha, Toyota-shi Aichi-ken (JP)

(72) Inventor: Hayato Suzuki, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 39 days.

(21) Appl. No.: 15/650,250

(22) Filed: Jul. 14, 2017

(65) Prior Publication Data
US 2018/0023433 A1    Jan. 25, 2018

(30) Foreign Application Priority Data
Jul. 21, 2016    (JP) .................................. 2016-143625

(51) Int. Cl.
*F01N 3/025*    (2006.01)
*F01N 3/10*    (2006.01)
(Continued)

(52) U.S. Cl.
CPC ........... *F01N 3/0253* (2013.01); *F01N 3/103* (2013.01); *F01N 11/002* (2013.01);
(Continued)

(58) Field of Classification Search
CPC ...... F01N 11/002; F01N 3/0253; F01N 3/103; F01N 2430/00; F01N 2900/0416;
(Continued)

(56) References Cited

U.S. PATENT DOCUMENTS

| | | | | |
|---|---|---|---|---|
| 2004/0261414 A1* | 12/2004 | Araki | .................... | F02B 75/02 60/602 |
| 2012/0232771 A1* | 9/2012 | O'Hear | .................... | F02D 41/10 701/103 |
| 2014/0303874 A1* | 10/2014 | Sasaki | .................... | F02D 41/064 701/104 |

FOREIGN PATENT DOCUMENTS

| | | |
|---|---|---|
| EP | 1515015 | 3/2005 |
| EP | 2942505 | 11/2015 |

(Continued)

OTHER PUBLICATIONS

Journal of Technical Disclosure No. 2016-500995, Japan Institute for Promoting Invention and Innovation and Concise Explanation of Relevance thereof (Apr. 1, 2016).

*Primary Examiner* — Phutthiwat Wongwian
*Assistant Examiner* — Matthew T Largi
(74) *Attorney, Agent, or Firm* — Dinsmore & Shohl LLP

(57) ABSTRACT

An object is to enable an exhaust gas purification system to bring about satisfactory oxidation of fuel in an oxidation catalyst in a temperature raising process of a filter, thereby allowing fuel supply to be performed at as low a temperature as possible. In the exhaust gas purification system, when the temperature of the exhaust gas flowing into the oxidation catalyst exceeds a specific threshold temperature that is determined based on the cetane number of fuel, a controller performs the temperature raising process. If the quantity of heat generated in the oxidation catalyst per unit time is smaller than a specific value while the temperature raising process is being performed, the temperature raising process in progress is suspended. The temperature raising process is resumed later on when the temperature of the exhaust gas flowing into the oxidation catalyst exceeds an updated threshold temperature higher than the specific threshold temperature.

3 Claims, 6 Drawing Sheets

(51) Int. Cl.
  *F01N 11/00* (2006.01)
  *F02D 41/02* (2006.01)
  *F02D 41/14* (2006.01)
  *F02D 41/12* (2006.01)
  *F02D 41/00* (2006.01)

(52) U.S. Cl.
  CPC ....... *F02D 41/0235* (2013.01); *F02D 41/123* (2013.01); *F02D 41/1475* (2013.01); *F02D 41/1497* (2013.01); *F01N 2430/00* (2013.01); *F01N 2900/0416* (2013.01); *F01N 2900/1602* (2013.01); *F02D 41/0087* (2013.01); *F02D 2200/0612* (2013.01); *F02D 2200/1012* (2013.01)

(58) Field of Classification Search
  CPC ......... F01N 2900/1602; F02D 41/0235; F02D 41/123; F02D 41/1475; F02D 41/1497; F02D 2200/0612; F02D 2200/1012; F02D 41/0087
  See application file for complete search history.

(56) References Cited

FOREIGN PATENT DOCUMENTS

| | | |
|---|---|---|
| JP | 2005-083352 | 3/2005 |
| JP | 2010261345 A | 11/2010 |
| JP | 2012-002141 | 1/2012 |
| JP | 2014047699 A | 3/2014 |
| JP | 2015075004 A | 4/2015 |
| JP | 2015-214895 | 12/2015 |
| WO | 2006066043 A1 | 6/2006 |
| WO | 2015052566 A2 | 4/2015 |

* cited by examiner

[FIG. 1]
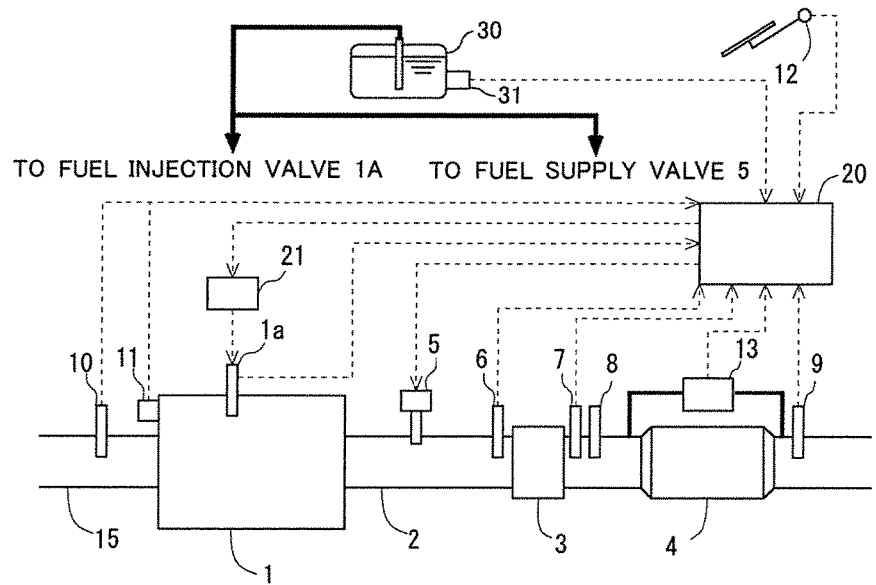
[FIG. 2]
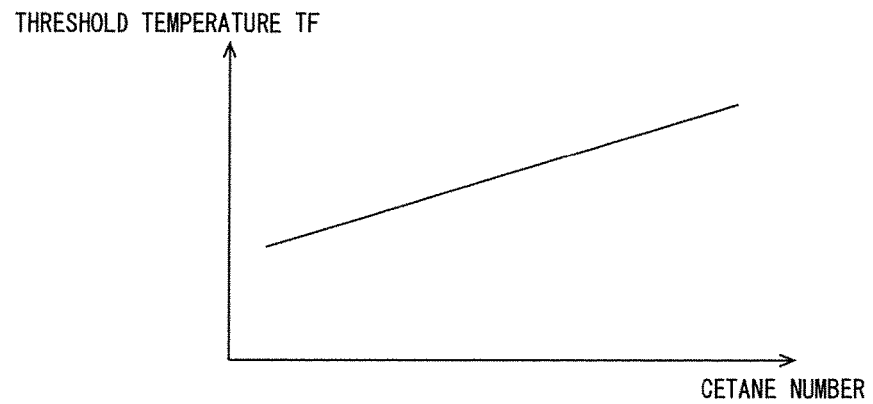

[FIG. 3]
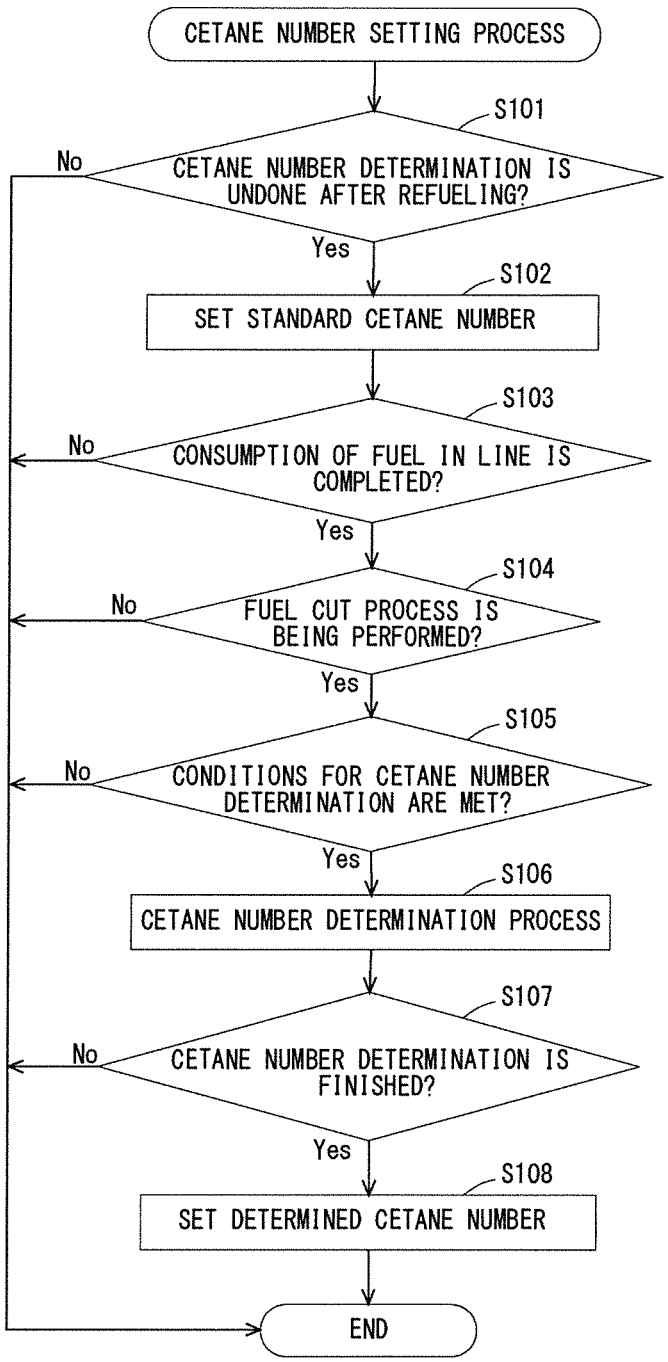

[FIG. 4]
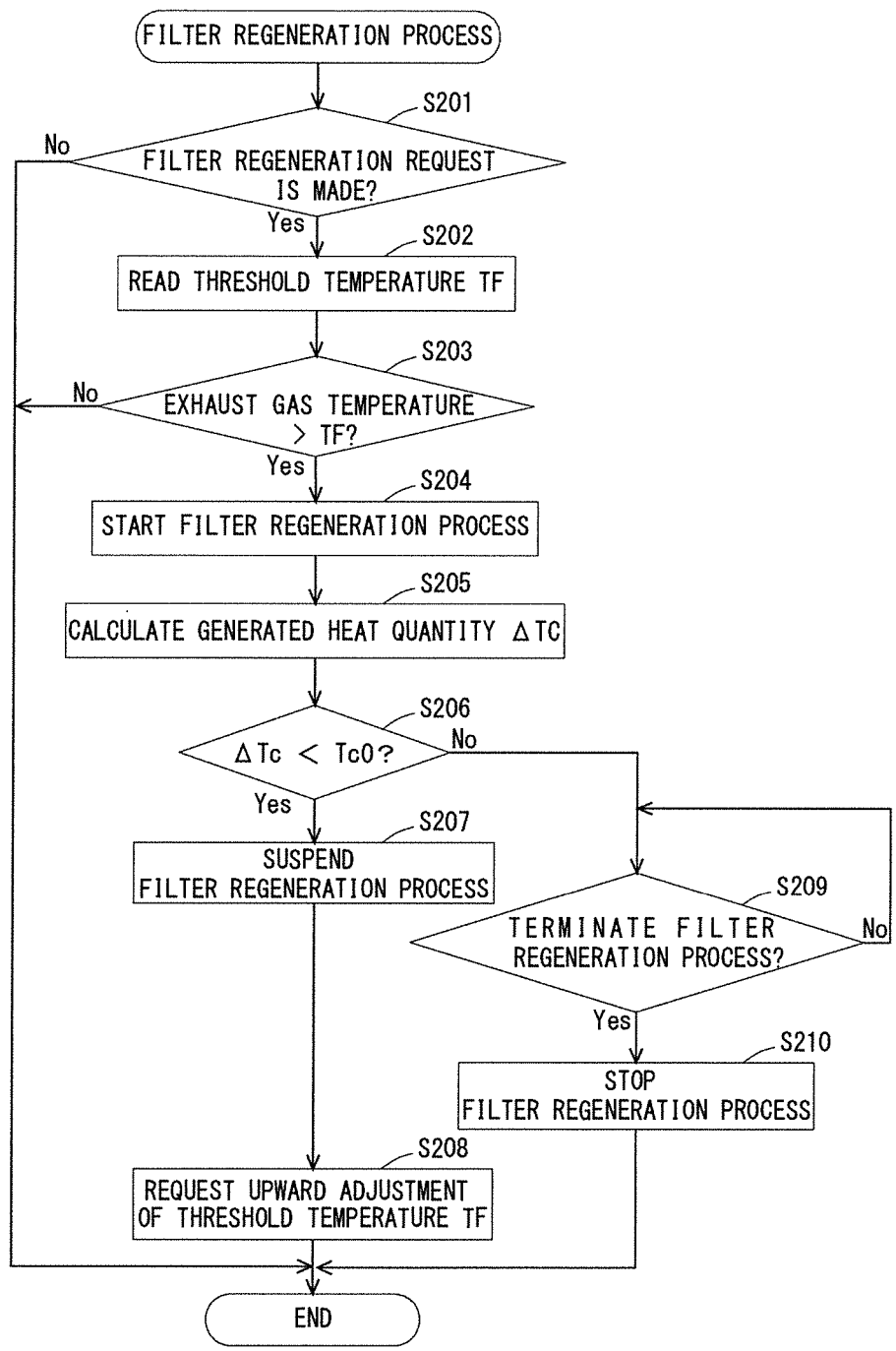

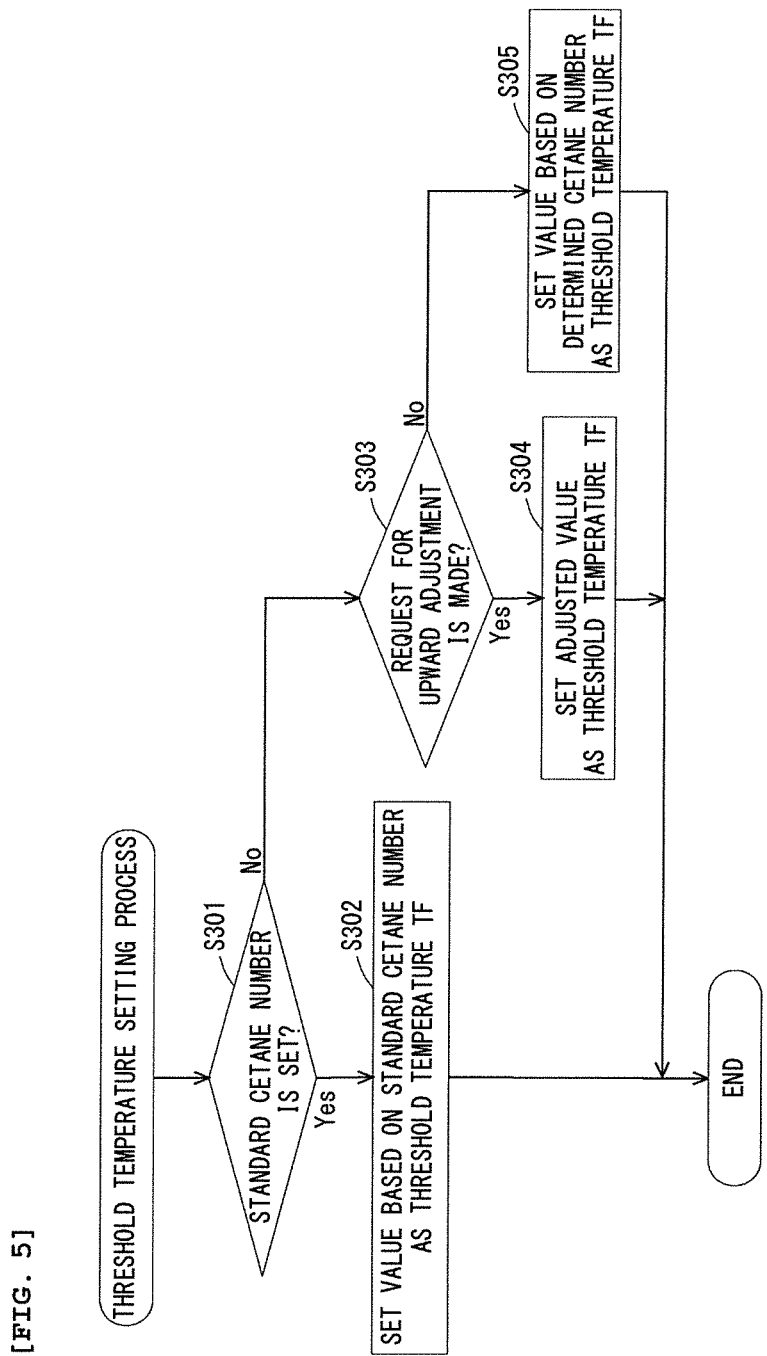
[FIG. 5]

[FIG. 6A]
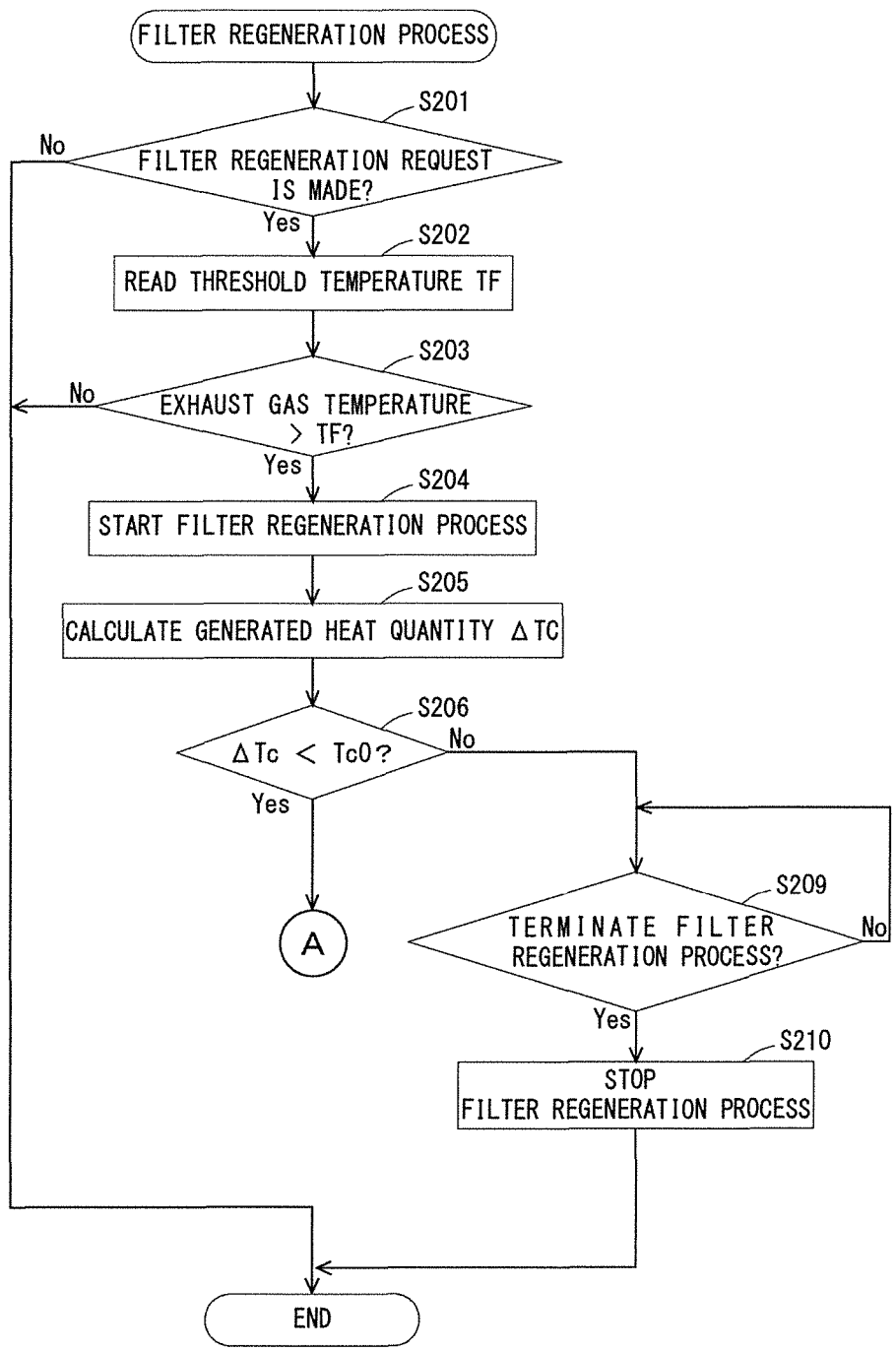

[FIG. 6B]
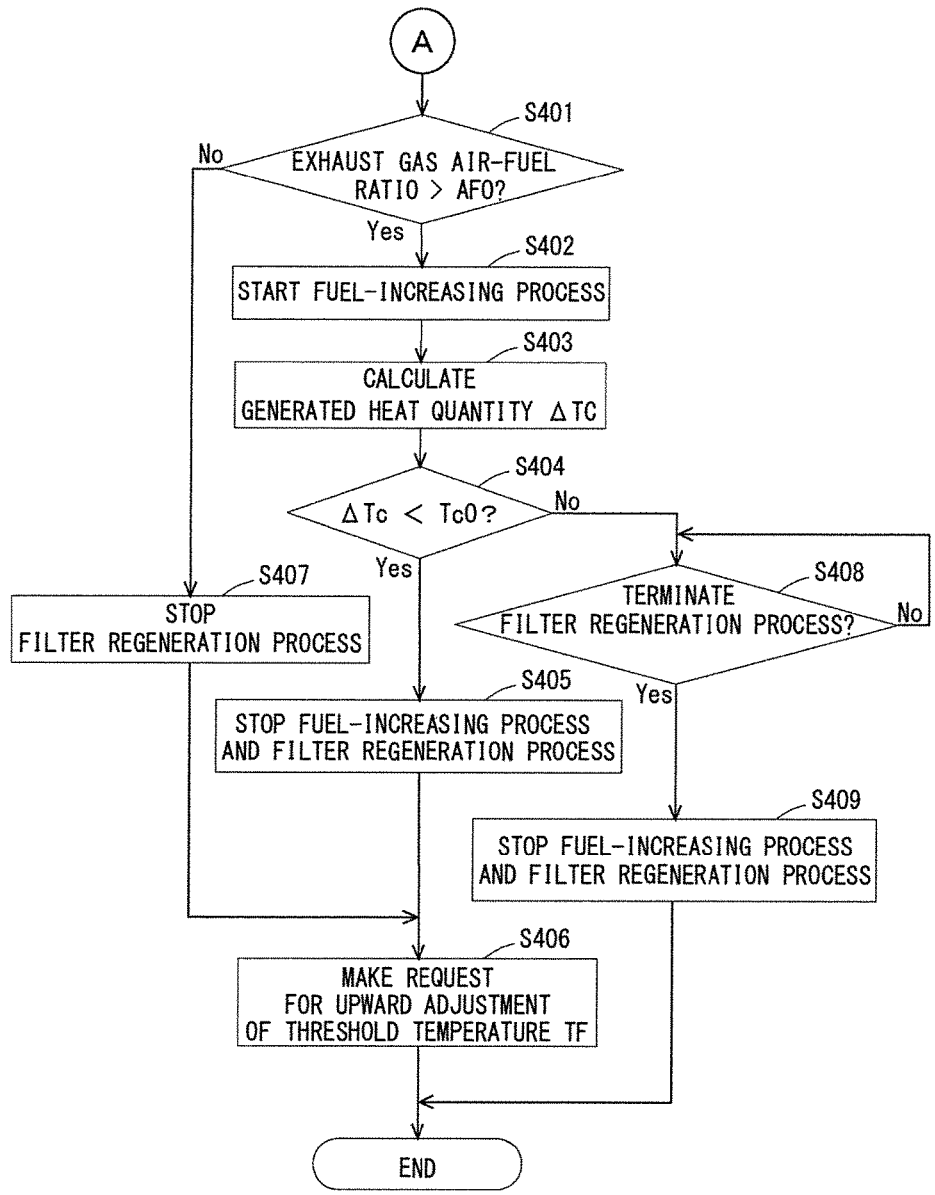

EXHAUST GAS PURIFICATION SYSTEM FOR INTERNAL COMBUSTION ENGINE

CROSS-REFERENCE TO RELATED APPLICATIONS

This application claims priority to Japanese Patent Application No. 2016-143625 filed on Jul. 21, 2016, the entire contents of which are incorporated by reference.

BACKGROUND

Technical Field

The present disclosure relates to an exhaust gas purification system for an internal combustion engine.

Description of the Related Art

Internal combustion engines are provided with a filter arranged in the exhaust passage to prevent or reduce emissions of particulate matter (which will be hereinafter referred to as "PM") in the exhaust gas to the external environment. PM in the exhaust gas is gradually deposited in the filter as the operation of the internal combustion engine continues. To avoid clogging of the filter, a filter regeneration process is performed. For instance, in the case of diesel engines, in which the air-fuel ratio of the exhaust gas is in general continuously lean, a filter regeneration process is performed by supplying unburned fuel to the exhaust gas to raise the temperature of the exhaust gas using an oxidation catalyst or the like provided in the exhaust passage, thereby removing the trapped PM by oxidation.

In that case, to carry out the filter regeneration process successfully, it is necessary that the fuel supplied to the exhaust gas be oxidized by the oxidation catalyst, and it is desirable that the fuel be in a sufficiently vaporized state in the oxidation catalyst in order for the oxidation reaction to progress smoothly. However, properties (in particular the volatility) of diesel engine fuels available in the market are not always uniform but vary to some extent. A countermeasure to such variations is disclosed in, for example, Non-patent Literature 1. In the technology disclosed in Non-patent Literature 1, the cetane number of fuel, which correlates with the volatility of fuel to some extent, is estimated, and the threshold of the exhaust gas temperature at which supply of fuel for the filter regeneration process is started is adjusted taking account of the estimated cetane number. Thus, fuel is supplied at a time appropriate for oxidation of fuel in the oxidation catalyst, so that the frequency of performing the filter regeneration process is increased.

CITATION LIST

Patent Literature

Patent Literature 1: Japanese Patent Application Laid-Open No. 2015-214895

Patent Literature 2: Japanese Patent Application Laid-Open No. 2005-83352

Patent Literature 3: Japanese Patent Application Laid-Open No. 2012-2141

Non-Patent Literature

Non-patent Literature 1: Journal of Technical Disclosure No. 2016-500995, Japan Institute for Promoting Invention and Innovation

SUMMARY

When supplying fuel to the exhaust gas for filter regeneration, if the exhaust gas temperature at which the supply of fuel is started is low, oxidation reaction of fuel in the oxidation catalyst does not progress satisfactorily, and problems such as adhesion of fuel to the oxidation catalyst will arise. In the aforementioned prior art, the supply of fuel is performed taking account of the cetane number of the fuel, whereby fuel can be supplied at as low a temperature as possible while allowing oxidation of fuel in the oxidation catalyst, so that the frequency of performing the filter regeneration process is increased. However, it is true that the cetane number of internal combustion engine fuels is a value that correlates with the volatility of fuels to some extent, but the cetane number originally is an indicator relating to the self-ignitability of fuels. If fuel supply for filter regeneration is performed on the basis of the cetane number, there may be cases where fuel supply is conducted at a time at which sufficient oxidation of fuel in the oxidation catalyst cannot be expected according to properties of the fuel. In such cases, problems such as deterioration in the activity of oxidation catalyst due to adhesion of fuel to the oxidation catalyst will arise.

The present disclosure has been made in view of the above-described problem, and an object of the present disclosure is to enable an exhaust gas purification system for an internal combustion engine comprising a filter and an oxidation catalyst to bring about satisfactory oxidation of fuel in the oxidation catalyst in a temperature raising process for raising the temperature of the filter such as a filter regeneration process, thereby allowing fuel supply to be performed at as low a temperature as possible.

Solution to Problem

According to the present disclosure, to solve the above problem, a threshold of the exhaust gas temperature for performing a process of raising the temperature of the filter (a temperature raising process) is determined on the basis of the cetane number of the fuel of the internal combustion engine, and in addition, when the quantity of heat generated in the oxidation catalyst is not sufficient while the temperature raising process is being performed, the threshold of the exhaust gas temperature for the temperature raising process is adjusted to a higher temperature. Thus, oxidation reaction of fuel in the oxidation catalyst can be achieved sufficiently taking account of the volatility of the fuel.

Specifically, the present disclosure resides in an exhaust gas purification system for an internal combustion engine which comprises: a filter provided in an exhaust passage of an internal combustion engine to trap particulate matter in exhaust gas; an oxidation catalyst provided in said exhaust passage upstream of said filter or supported on said filter; a fuel supplier that is configured to supply fuel to the exhaust gas upstream of said oxidation catalyst; and a controller comprising at least one processor configured to: determine, after fuel is supplied to a fuel tank of said internal combustion engine, the cetane number of said fuel used in the internal combustion engine after the supply of fuel; and perform a temperature raising process, which is a process of raising the temperature of said filter by heat of oxidation reaction of fuel in said oxidation catalyst, by supplying fuel to the exhaust gas through said fuel supplier when the temperature of the exhaust gas flowing into said oxidation catalyst exceeds a specific threshold temperature that is determined on the basis of the cetane number of the fuel, said threshold temperature being set lower when the cetane number of the fuel is low than when the cetane number of the fuel is high, wherein when the quantity of heat generated in said oxidation catalyst per unit time is smaller than a specific value while said temperature raising process is being performed, said controller may suspend the temperature raising process in progress, and resume said temperature raising process later on when the temperature of the exhaust gas flowing into said oxidation catalyst exceeds an updated threshold temperature higher than said specific threshold temperature.

In the exhaust gas purification system according to the present disclosure, the filter is provided in the exhaust passage to mainly trap PM in the exhaust gas, thereby reducing emissions of PM to the external environment. Since increases in the amount of trapped PM detrimentally affects the combustion state of the internal combustion engine, an oxidation catalyst is provided to raise the temperature of the filter to remove the PM trapped in the filter by oxidation. The oxidation catalyst may be either provided upstream of the filter or supported on the filter. With this oxidation catalyst, fuel supplied by the fuel supplier is oxidized, so that the temperature of the filter is raised by the heat of the oxidation reaction.

In the oxidation reaction of fuel in the oxidation catalyst, the higher the volatility of the fuel is, the more excellently the oxidation reaction progresses. Therefore, if the volatility of a fuel is high, the fuel may be supplied to the exhaust gas when the exhaust gas temperature is relatively low, and heating of the filter is facilitated. In the above-described exhaust gas purification system, the controller is configured to adjust the timing of performing the temperature raising process for raising the temperature of the filter on the basis of the cetane number of fuel. The cetane number correlates with the volatility of fuel to some extent. Specifically, the smaller the cetane number of fuel is, the higher the volatility tends to be generally. Therefore, the specific threshold temperature serving as a threshold of the exhaust gas temperature above which fuel is allowed to be supplied to the exhaust gas is set lower when the cetane number of fuel is low than when it is high. The controller supplies fuel to the exhaust gas for the temperature raising process according to the specific threshold temperature that is determined on the basis of the cetane number of fuel. Thus, fuel used in the internal combustion engine can be supplied to the exhaust gas at an exhaust gas temperature appropriate for that fuel. In other words, fuel can be supplied to the exhaust gas at as low a temperature as possible. Thus, the frequency, at which the temperature raising process can be performed, can be increased.

The cetane number of fuel is determined by the controller. Although the cetane number correlates with the volatility of fuel to some extent, there are fuels of which the volatility does not agree with the volatility estimated from the cetane number. This is because the cetane number is an indicator of the self-ignitability of fuel. There may be cases where the aforementioned specific threshold temperature that is set on the basis of the cetane number determined by the controller does not appropriately agree with the volatility of fuel. In such cases, if fuel is supplied to the exhaust gas according to the specific threshold temperature for the temperature raising process, there may be cases where the oxidation reaction of fuel in the oxidation catalyst does not progress satisfactorily and the temperature of the filter cannot be raised appropriately.

To address the above problem, the exhaust gas purification system for an internal combustion engine according to the present disclosure is configured to suspend the temperature raising process in progress when the quantity of heat generated per unit time by the oxidation reaction of fuel in the oxidation catalyst while the temperature raising process is being performed by the controller is smaller than a specific value. The specific value mentioned above is a quantity of heat that is expected to be generated by the oxidation reaction of fuel that is supplied to the oxidation catalyst with the exhaust gas in the temperature raising process performed taking account of the cetane number of the fuel. Therefore, if the quantity of heat generated in the oxidation catalyst per unit time during the temperature raising process is smaller than this specific value, there is a possibility that the actual volatility of the fuel may be lower than the volatility of the fuel assumed on the basis of the cetane number. If the temperature raising process is continued in such a state, undesirable circumstances such as the adhesion of fuel to the oxidation catalyst leading to a decrease in the activity can arise. Therefore, when the quantity of heat generated in the oxidation catalyst per unit time is smaller than the specific value, the ongoing temperature raising process is suspended. Then, since there is a possibility that the volatility is lower than assumed, the threshold of the exhaust gas temperature for performing the temperature raising process is changed to an updated threshold temperature higher than the specific threshold temperature that is determined on the basis of the cetane number determined by the controller. Consequently, the temperature raising process is resumed in a condition in which the exhaust gas temperature is higher. Therefore, even if the actual volatility of fuel is lower than the volatility assumed on the basis of the cetane number, the oxidation reaction of fuel in the oxidation catalyst will progress satisfactorily.

As described above, in the exhaust gas purification system for an internal combustion engine according to the present disclosure, the threshold of the exhaust gas temperature at which the supply of fuel to the exhaust gas for the temperature raising process is to be started is determined on the basis of the cetane number of the fuel. Moreover, if the temperature of the exhaust gas is not sufficiently raised by the oxidation catalyst when the supply of fuel is performed according to this threshold, the threshold is updated to a higher value. Thus, the supply of fuel is allowed to be performed at as low a temperature as possible on the basis of the cetane number of fuel, and satisfactory oxidation reaction of fuel in the oxidation catalyst is ensured in the temperature raising process. Therefore, it is possible to increase the frequency of performing the temperature raising process preferably.

The above-described exhaust gas purification system for an internal combustion engine, wherein the controller may be further configured to perform, when the air-fuel ratio of the exhaust gas to which fuel has been supplied by said fuel supplier is leaner than a specific air-fuel ratio associated with said temperature raising process while said temperature raising process is being performed, a fuel-increasing process which is a process of increasing the quantity of fuel supplied through said fuel supplier in said temperature raising process so as to make the air-fuel ratio of the exhaust gas equal to said specific air-fuel ratio. Moreover, when the quantity of heat generated in said oxidation catalyst per unit time is smaller than said specific value while said fuel-increasing process is being performed during said temperature raising process, said controller suspends the temperature raising process and the fuel-increasing process in progress, and resumes said temperature raising process later on when the temperature of the exhaust gas flowing into said oxidation catalyst exceeds said updated threshold temperature.

If the quantity of heat generated in the oxidation catalyst per unit time is smaller than the specific value while the temperature raising process is being performed, there is a possibility that the actual volatility of the fuel is lower than the volatility of the fuel assumed on the basis of the cetane number, as described above. Furthermore, there also is a possibility that the quantity of heat generated in the oxidation catalyst per unit time falls short of the specific value because of insufficiency of fuel supply to the exhaust gas by the fuel supplier. When the air fuel ratio of the exhaust gas to which fuel has been supplied in the temperature raising process is leaner than the specific air-fuel ratio associated with the temperature raising process, namely the air-fuel ratio of the exhaust gas that is expected to be formed if a quantity of fuel to be supplied in the temperature raising process is actually supplied, it may be concluded that the supply of fuel by the fuel supplier is insufficient. In that case, the above-described exhaust gas purification system performs the fuel-increasing process by the controller. Then, if the quantity of heat generated in the oxidation catalyst per unit time is smaller than the specific value while the fuel-increasing process is being performed, it is reasonable to conclude that it is probable that the actual volatility of the fuel is lower than the volatility of the fuel estimated on the basis of the cetane number. In that case, the temperature raising process and the fuel-increasing process in progress may be suspended, and the aforementioned updated threshold temperature as a threshold of the exhaust gas temperature at which the temperature raising process is to be resumed may be set.

The fuel-increasing process by the controller may be performed either after it is determined that the quantity of heat generated in the oxidation catalyst per unit time is smaller than the specific value after the start of the temperature raising process or before checking the quantity of heat generated in the oxidation catalyst per unit time after the start of the temperature raising process. In either case, the possibility that insufficiency in heating of the exhaust gas by the oxidation catalyst is attributable to insufficiency in the supply of fuel to the exhaust gas by the fuel supplier can be excluded by performing the fuel-increasing process. Therefore, the insufficiency in heating attributable to the volatility of the fuel can be addressed appropriately.

In the above-described exhaust gas purification system for an internal combustion engine, when the quantity of heat generated in said oxidation catalyst per unit time is equal to or larger than said specific value while said fuel-increasing process is being performed during said temperature raising process, said controller may continue the temperature raising process with the fuel-increasing process being performed. If the quantity of heat generated in the oxidation catalyst per unit time is equal to or larger than the specific value while the fuel-increasing process is being performed, it is reasonable to conclude that the possibility that the actual volatility of the fuel is lower than the volatility of the fuel estimated on the basis of the cetane number is low. In that case, heating of the filter can be carried out satisfactorily by continuing the temperature raising process while performing the fuel-increasing process. In that case, the threshold exhaust gas temperature for starting the supply of fuel is not changed.

The present disclosure enables an exhaust gas purification system for an internal combustion engine comprising a filter and an oxidation catalyst to bring about satisfactory oxidation of fuel in the oxidation catalyst in the process of raising the temperature of the filter, thereby allowing fuel supply to be performed at as low a temperature as possible.

BRIEF DESCRIPTION OF DRAWINGS

FIG. 1 is a diagram showing the general configuration of an exhaust gas purification system for an internal combustion engine according to the present disclosure.

FIG. 2 is a graph showing relationship between the cetane number of fuels used in an internal combustion engine and a threshold temperature about the exhaust gas temperature for starting a filter regeneration process that is determined on the basis of the cetane number.

FIG. 3 is a flow chart of a cetane number setting process executed in the exhaust gas purification system for an internal combustion engine shown in FIG. 1.

FIG. 4 is a flow chart of a filter regeneration control executed in the exhaust gas purification system for an internal combustion engine shown in FIG. 1 according to a first embodiment of the present disclosure.

FIG. 5 is a flow chart of a process for setting the threshold temperature about the exhaust gas temperature for starting the filter regeneration process, which also serves as a parameter used in the filter regeneration process.

FIG. 6A is the first flow chart of the filter regeneration process executed in the exhaust gas purification system for an internal combustion engine shown in FIG. 1 according to a second embodiment of the present disclosure.

FIG. 6B is the second flow chart of the filter regeneration process executed in the exhaust gas purification system for an internal combustion engine shown in FIG. 1 according to the second embodiment of the present disclosure.

DESCRIPTION OF EMBODIMENTS

In the following, specific embodiments of the present disclosure will be described with reference to the drawings. The dimensions, materials, shapes, relative arrangements, and other features of the components that will be described in connection with the embodiments are not intended to limit the technical scope of the present disclosure only to them, unless otherwise stated.

Embodiment 1

FIG. 1 is a diagram showing the general configuration of an exhaust gas purification system for an internal combustion engine 1 according to the present disclosure. The internal combustion engine 1 is a diesel engine for driving a vehicle. The internal combustion engine 1 is connected with an exhaust passage 2. The exhaust passage 2 is provided with a particulate filter 4 that traps PM in the exhaust gas. The particulate filter 4 will be simply referred to as the "filter" hereinafter. The exhaust passage 2 is also provided with an oxidation catalyst 3 arranged upstream of the filter 4. The oxidation catalyst 3 has the function of oxidizing unburned fuel components in the exhaust gas flowing into it.

The exhaust passage 2 is also provided with a fuel supply valve 5 arranged upstream of the oxidation catalyst 3. The fuel supply valve 5 supplies fuel (unburned fuel) to the exhaust gas flowing into the oxidation catalyst 3. The exhaust passage 2 is provided with a first temperature sensor 6 and a second temperature sensor 7. The first temperature sensor 6 is arranged upstream of the oxidation catalyst 3 to measure the temperature of the exhaust gas flowing into the oxidation catalyst 3, and the second temperature sensor 7 is arranged downstream of the oxidation catalyst 3 to measure the temperature of the exhaust gas flowing out of the oxidation catalyst 3. The exhaust passage 2 is provided with an air-fuel ratio sensor 8, which is arranged downstream of the oxidation catalyst 3 to measure the air-fuel ratio of the exhaust gas flowing out of the oxidation catalyst 3. The exhaust passage 2 is also provided with a third temperature sensor 9 and a differential pressure sensor 13, which are arranged near the filter 4. The third temperature sensor 9 measures the temperature of the exhaust gas flowing in the exhaust passage 2 downstream of the filter 4. The differential pressure sensor 13 measures the differential pressure of the exhaust gas across the filter 4, or the difference between the exhaust gas pressure in the exhaust passage 2 upstream of the filter 4 and the exhaust gas pressure in the exhaust passage 2 downstream of the filter 4.

The intake passage 15 of the internal combustion engine 1 is provided with an air flow meter 10 capable of measuring the flow rate of the intake air flowing in the intake passage 15. An electronic control unit (ECU) 20 is provided for the internal combustion engine 1. The ECU 20 controls the operation state of the internal combustion engine 1. The ECU 20 is electrically connected with the fuel supply valve 5, the temperature sensors 6, 7, 9, the air-fuel ratio sensor 8, the differential pressure sensor 13, the air flow meter 10, a crank position sensor 11, and an accelerator opening degree sensor 12. The fuel supply valve 5 supplies fuel to the exhaust gas according to instructions from the ECU 20. Measurement values of the sensors are given to the ECU 20. For example, the crank position sensor 11 measures the crank angle of the internal combustion engine 1 and sends it to the ECU 20. The accelerator opening degree sensor 12 measures the accelerator opening degree of the vehicle provided with the internal combustion engine 1 and sends it to the ECU 20. The ECU 20 calculates the engine speed of the internal combustion engine 1 from the measurement value of the crank position sensor 11 and calculates the engine load of the internal combustion engine 1 from the measurement value of the accelerator opening degree sensor 12. Moreover, the ECU 20 can determine the temperature of the exhaust gas flowing into the oxidation catalyst 3 on the basis of the measurement value of the first temperature sensor 6, the temperature of the oxidation catalyst 3 on the basis of the measurement value of the second temperature sensor 7, and the temperature of the filter 4 on the basis of the measurement value of the third temperature sensor 9. The ECU 20 can determine the state of deposition of PM in the filter 4 on the basis of the measurement value of the differential pressure sensor 13.

The internal combustion engine 1 has a plurality of cylinders, each of which is provided with a fuel injection valve 1a. The fuel injection valve 1a has a pressure sensor (not shown) built in it, and the fuel injection pressure measured by the pressure sensor is sent to the ECU 20. The ECU 20 sends a drive command to an ejection drive unit (EDU) 21 on the basis of the engine load and the engine speed of the internal combustion engine 1 and the fuel injection pressure measured by the pressure sensor, and the fuel injection valve 1a is controlled by a drive signal sent from the EDU 21.

Fuel for the internal combustion engine 1 is stored in a fuel tank 30 and supplied to the fuel injection valve 1a and the fuel supply valve 5 through fuel supply lines. The fuel tank 30 is provided with an opening and closing sensor 31 that senses opening and closing of a tank cap that is opened for refueling. The opening and closing sensor 31 informs the ECU 20 of the opening and closing status of the tank cap.

In the exhaust gas purification system of the internal combustion engine 1 configured as above, particulate matter (PM) contained in the exhaust gas is generally trapped by the filter 4 to reduce emissions to the environment. An exhaust gas purification catalyst (such as catalyst for removing NOx) that is not shown in the drawings may be additionally provided. As PM is trapped by and deposited in the filter 4, the back pressure in the exhaust passage 2 increases. When the amount of PM deposited in the filter 4 reaches a limit deposition amount, a filter temperature raising process is performed to remove the PM by oxidation. Such a temperature raising process (or heating process) for removing the trapped PM by oxidation will be referred to as the "filter regeneration process" in this specification. Specifically, in the filter regeneration process, a certain quantity of fuel is supplied to the exhaust gas by the fuel supply valve 5 and oxidized by the oxidation catalyst 3, whereby the exhaust gas temperature is raised. Consequently, the temperature of the filter 4 rises, and the PM deposited in the filter 4 is removed by oxidation.

When fuel is supplied to the exhaust gas by the fuel supply valve 5 to raise the temperature of the filter 4, it is necessary that the supplied fuel be oxidized satisfactorily by the oxidation catalyst 3. If the oxidation reaction is not carried out satisfactorily, there can arise situations such as a decrease in the activity of the oxidation catalyst 3 due to adhesion of supplied fuel to the oxidation catalyst 3. Volatility of fuel is important in order for the oxidation reaction of fuel by the oxidation catalyst 3 to be carried out satisfactorily. More specifically, the higher the volatility of fuel is, the more the oxidation reaction is likely to be carried out satisfactorily in the oxidation catalyst 3. If the volatility of fuel is high, fuel can be supplied to the exhaust gas without causing the aforementioned situation even if the temperature of the oxidation catalyst 3 is relatively low, namely even if the temperature of the exhaust gas flowing into the oxidation catalyst 3 is relatively low. Then, the chance of performing the process for raising the temperature of the filter 4 such as the filter regeneration process is increased.

Given the above-described relationship between the volatility of fuel and the oxidation reaction in the oxidation catalyst 3, the exhaust gas purification system for the internal combustion engine 1 according to the present disclosure is configured to adjust a threshold temperature Tf according to the cetane number of fuel, which correlates with the volatility of fuel to some extent. The threshold temperature Tf is a threshold of the exhaust gas temperature (namely, the temperature of the exhaust gas flowing into the oxidation catalyst 3) above which the filter regeneration process is allowed to be performed. Generally speaking, the smaller the cetane number is, the higher the volatility of fuel tends to be. Therefore, in the exhaust gas purification system for the internal combustion engine according to the present disclosure, the smaller the cetane number of fuel is, the smaller the value of the threshold temperature Tf is set, as shown in FIG. 2. By setting this relationship between the threshold temperature Tf for the filter regeneration process and the cetane number, the value of the threshold temperature Tf is set small when a fuel having high volatility (i.e. having a small cetane number) is supplied to the internal combustion engine 1, because the oxidation reaction in the oxidation catalyst 3 tends to progress more excellently with such a fuel. Thus, it is possible to increase the frequency of performing the filter regeneration process.

Now, setting of the cetane number of fuel needed to carry out the above-described filter regeneration process according to the cetane number of fuel will be described with reference to FIG. 3. FIG. 3 is a flow chart of the process of setting the cetane number of fuel used in the internal combustion engine 1. This cetane number setting process is a control process that is performed repeatedly by execution of a certain control program in the ECU 20. Firstly in step S101, it is determined whether or not the determination of the cetane number by the cetane number determination process executed in step S106 (described later) has been undone since the supply of fuel to the fuel tank 30 (or refueling). In detecting the supply of fuel to the fuel tank 30, it may be determined that the supply of fuel to the fuel tank 30 is performed when the opening and closing sensor 31 detects the opening of the tank cap. Alternatively, refueling may be detected by measuring the amount of fuel contained in the fuel tank 30 by another sensor. When the supply of fuel to the fuel tank 30 is performed, there is a possibility that the cetane number of the fuel in the fuel tank 30 may be different from the cetane number that has been known before, namely there is a possibility that the cetane number of the fuel becomes unknown. When the supply of fuel to the fuel tank 30 was performed and the determination of the cetane number by the cetane number determination process in step S106 has been undone after that, an affirmative determination is made in step S101, and the process proceeds to step S102. When the determination of cetane number has been done, a negative determination is made in step S101, and this cetane number setting process is terminated.

In step S102, since the cetane number of fuel after refueling is unknown, a standard cetane number is set as a provisional cetane number of fuel. The standard cetane number may be set to a value, in the range of cetane numbers that common fuels available in the market can have (e.g. between 45 and 60), that makes the threshold temperature Tf as high as possible in order to avoid adhesion of fuel to the oxidation catalyst 3, namely the highest cetane number in that range. Alternatively, the standard cetane number may be set to the cetane number used before refueling, namely the cetane number determined by the cetane number determination process performed after the previous time refueling. After the completion of the processing of step S102, the process proceeds to step S103.

In step S103, it is determined whether or not the fuel in the fuel supply line (including the common rail) between the fuel tank 30 and the fuel injection valve 1a has been consumed completely. It is probable that the fuel of the kind used before the supply of fuel to the fuel tank 30 is remaining in the fuel supply line. As will be described later, in the cetane number determination process in step S106, the cetane number of the new fuel is determined on the basis of the rotational fluctuation that occurs when a small quantity of fuel is injected through the fuel injection valve 1a. Therefore, it is undesirable that the old (or previous kind of) fuel is remaining in the fuel supply line when the cetane number determining process is performed. In step S103, if the integrated amount of fuel consumed by operation of the internal combustion engine 1 after the supply of fuel to the fuel tank 30 exceeds the amount equal to the capacity of the fuel supply line, it may be determined that the fuel in the fuel supply line has been consumed completely. If an affirmative determination is made in step S103, the process proceeds to step S104. If a negative determination is made, the cetane number setting process is terminated.

In step S104, it is determined whether or not fuel cut process is being performed in the internal combustion engine 1. The fuel cut process is the process of suspending the fuel injection by the fuel injection valve 1a, for example, during deceleration of the internal combustion engine 1. If an affirmative determination is made in step S104, the process proceeds to step S105. If a negative determination is made, the cetane number setting process is terminated.

In step S105, it is determined whether or not conditions for determining the cetane number of fuel are met. Specifically, the conditions for determining the cetane number are met when the following two conditions are both met. The first condition is that the high load operation or the low load operation was not performed in the internal combustion engine 1 immediately before the fuel cut process is performed. In the case where the high load operation was performed immediately before the fuel cut process, the temperature of the inner wall of the cylinder of the internal combustion engine 1 during the fuel cut process is relatively high. Then, an environment in which fuel is more apt to be vaporized due to external factors is established. This is not an environment that allows accurate determination of the cetane number, which relates to the volatility of fuel. In the case where the low load operation was performed immediately before the fuel cut process, the temperature of the inner wall of the cylinder of the internal combustion engine 1 during the fuel cut process is relatively low. Then, an environment in which fuel is less apt to be vaporized due to external factors is established. This is not an environment that allows accurate determination of the cetane number, which relates to the volatility of fuel. Hence, in the above cases, it is deemed that the condition for determining the cetane number is not met, because it is difficult to determine the intrinsic volatility of the fuel accurately in these cases.

The second condition is that the engine speed of the internal combustion engine 1 is lower than a standard engine speed. As will be described later, in the cetane number determination process in step S106, the cetane number of the new fuel is determined on the basis of the rotational fluctuation that occurs when a small quantity of fuel is injected through the fuel injection valve 1a. Therefore, when the engine speed is excessively high at the time of determination, it may be difficult to measure the rotational fluctuation. For this reason, the second condition about the engine speed is set. If it is determined in step S105 that the conditions for determining the cetane number including the first and second conditions are met, the process proceeds to step S106. If it is determined in step S105 that the conditions for determining the cetane number including the first and second conditions are not met, the cetane number setting process is terminated.

In step S106, the cetane number determination process is performed. Specifically, a very small quantity of fuel is injected into the cylinder through the fuel injection valve 1a in the internal combustion engine 1 while the fuel cut process is being performed, and the cetane number is calculated on the basis of the fluctuation of the engine speed (or rotational fluctuation) with the combustion of the fuel thus injected. Since the quantity of fuel injected to determine the cetane number is very small, the fuel injection to determine the cetane number is controlled using the fuel pressure measured by the pressure sensor provided in the fuel injection valve 1a as described above. The cetane number is calculated larger when the rotational fluctuation is large than when it is small. In this case, the fuel injection timing is adjusted in such a way that the ignition of fuel occurs at a specific time. After the completion of the processing of step S106, the process proceeds to step S107.

In step S107, it is determined whether or not the determination of the cetane number of the fuel has been done by the above-described cetane number determination process. If an affirmative determination is made in step S107, the process proceeds to step S108. If a negative determination is made, the cetane number setting process is terminated. In step S108, the cetane number of the fuel used in the internal combustion engine 1 after refueling is set to the cetane number determined by the above-described cetane number determination process, and then the cetane number setting process is terminated.

As above, in the cetane number setting process shown in FIG. 3, after the supply of fuel to the fuel tank 30 is performed in the internal combustion engine 1, the standard cetane number is set as a provisional cetane number of the fuel until the completion of the cetane number determination process. After the completion of the cetane number determination process, the cetane number determined by the cetane number determination process is set as the proper cetane number of the fuel. The cetane number thus set is used in calculation of the threshold temperature Tf for the filter regeneration process based on the relationship shown in FIG. 2.

As described above, it is generally possible to determine the relationship between the volatility and the cetane number of the fuel of the internal combustion engine 1, but there are fuels of which the volatility does not agree with the volatility estimated from the cetane number. This is because the cetane number is originally an indicator of the self-ignitability of fuels. Therefore, when the threshold temperature Tf is calculated on the basis of the relationship shown in FIG. 2, there may be cases where the threshold temperature Tf is not appropriate for the volatility of the presently used fuel. In such cases, there is a possibility that the fuel supplied through the fuel supply valve 5 to raise the temperature of the filter 4 may not be oxidized sufficiently in the oxidation catalyst 3 but adhere to the oxidation catalyst 3 to deteriorate the activity of the oxidation catalyst. The exhaust gas purification system for the internal combustion engine 1 according to the present disclosure is configured to perform the filter regeneration control shown in FIG. 4 in order to avoid the adhesion of fuel to the oxidation catalyst 3, enable excellent oxidation of fuel in the oxidation catalyst 3, and promote the temperature rise of the filter 4 satisfactorily, even in cases where the actual volatility of the fuel does not agree with the volatility estimated from the cetane number as described above. This filter regeneration process is a control process that is performed repeatedly by execution of a certain control program in the ECU 20.

Firstly in step S201, it is determined whether or not the total amount of PM trapped in the filter 4 (the trapped PM amount) exceeds a predetermined amount to require the execution of the filter regeneration process. In other words, it is determined whether or not a filter regeneration request is made. Specifically, if the differential pressure measured by the differential pressure sensor 13 exceeds a predetermined differential pressure, it is determined that the trapped PM amount exceeds the predetermined amount. If an affirmative determination is made in step S201, the process proceeds to step S202. If a negative determination is made, the filter regeneration control is terminated.

In step S202, the aforementioned threshold temperature Tf as the threshold of the exhaust gas temperature for starting the filter regeneration process is read from the memory of the ECU 20. The threshold temperature Tf is set by a threshold temperature setting process shown in FIG. 5 that is executed separately form this filter regeneration control and memorized in the memory of the ECU 20. As described above, the threshold temperature Tf is a threshold of the exhaust gas temperature that is set in order to allow the supply of fuel to be performed at as low a temperature as possible taking account of the oxidation reaction of fuel in the oxidation catalyst 3. The threshold temperature setting process will be specifically described later. After the completion of the processing of step S202, the process proceeds to step S203.

In step S203, it is determined whether or not the present temperature of the exhaust gas flowing into the oxidation catalyst 3 is higher than the threshold temperature Tf read in step S202. In other words, it is determined in step S203 whether or not the temperature of the exhaust gas flowing into the oxidation catalyst 3 measured by the first temperature sensor 6 is appropriate for oxidation of fuel in the oxidation catalyst 3, in order to determine whether the filter regeneration process may be started. If an affirmative determination is made in step S203, the process proceeds to step S204. If a negative determination is made, the filter regeneration control is terminated.

In step S204, the filter regeneration process is started, which is the process of supplying fuel to the exhaust gas in order to raise the temperature of the filter 4. In this filter regeneration process, the quantity of fuel supplied through the fuel supply valve 5 is controlled according to the rise in the temperature of the filter 4 to be achieved. For example, the temperature of the filter 4 is estimated from the temperature measured by the third temperature sensor 9, and the quantity of supplied fuel is controlled so that the temperature of the filter 4 will reach a target temperature to be achieved. Since an affirmative determination is made in step S203, the quantity of supplied fuel is determined on the assumption that the supplied fuel is oxidized in the oxidation catalyst 3 while having excellent volatility. The fuel supplied to the exhaust gas by the fuel supply valve 5 flows into the oxidation catalyst 3 and oxidized therein to raise the temperature of the exhaust gas, so that the temperature of the filter 4 is raised eventually. After the completion of the processing of step S204, the process proceeds to step S205.

In step S205, the heat quantity $\Delta Tc$ generated per unit time in the oxidation catalyst 3 by the filter regeneration process in step S204 is calculated. The generated heat quantity $\Delta Tc$ is a value representing the heat of oxidation reaction of the fuel in the oxidation catalyst 3. Specifically, the heat quantity $\Delta Tc$ generated in the oxidation catalyst 3 per unit time is calculated from the change of the temperature of the exhaust gas flowing out of the oxidation catalyst 3 measured by the second temperature sensor 7 per unit time. After the completion of the processing of step S205, the process proceeds to step S206.

In step S206, it is determined whether or not the generated heat quantity $\Delta Tc$ calculated in step S205 is smaller than a specific value Tc0. The aforementioned specific value Tc0 is the heat quantity expected to be generated by oxidation reaction of fuel in the oxidation catalyst 3 that is assumed to occur with the fuel supplied by the fuel supply valve 5 in the filter regeneration process in step S204. Therefore, an affirmative determination made in step S206 means that the fuel does not exhibit sufficient volatility contrary to the above assumption and the oxidation reaction of fuel in the oxidation catalyst 3 has not progressed satisfactorily. Then, in step S207, the filter regeneration process in progress is suspended, namely the supply of fuel to the exhaust gas by the fuel supply valve 5 is stopped. Moreover, in step S208, an adjustment request for adjusting the threshold temperature Tf upward (i.e. to a higher temperature) is made for the reason that the volatility of the fuel is not sufficient and the oxidation reaction of fuel in the oxidation catalyst 3 has not progressed satisfactorily. In other words, the threshold temperature Tf for starting the filter regeneration process is requested to be changed to a higher temperature in order to ensure sufficient volatility of the fuel. In response to this request, an updated threshold temperature Tf is set in the memory of the ECU 20 by the threshold temperature setting process that will be described later. This request is maintained until the supply of fuel to the fuel tank 30 is performed in the internal combustion engine 1 next time, and it is reset (or cancelled) upon the next refueling.

A negative determination made in step S206 means that the fuel exhibits sufficient volatility as assumed and the oxidation reaction of fuel in the oxidation catalyst 3 has progressed satisfactorily. Then, the process shifts from step S206 to step S209. In this case, the filter regeneration process is continued. In step S209, it is determined whether or not the filter regeneration process started in step S204 is to be terminated. For example, it is determined whether or not a length of time long enough to raise the temperature of the filter 4 by the filter regeneration process and to remove the PM trapped in the filter 4 by oxidation has elapsed since the start of the filter regeneration process. If an affirmative determination is made in step S209, the process proceeds to step S210, where the filter regeneration process is stopped. If a negative determination is made in step S209, the processing of step S209 is executed again.

Next, the threshold temperature setting process of setting the threshold temperature Tf as the threshold of the exhaust gas temperature at which the filter regeneration process is to be started will be described with reference to FIG. 5. The threshold temperature setting process is a control process that is performed repeatedly by execution of a certain control program in the ECU 20. This control process is performed independently from the above-described filter regeneration control. Firstly in step S301, it is determined whether or not the standard cetane number (cf. the processing of step S102 in the cetane number setting process) is set in the memory of the ECU 20 as the cetane number of the fuel. If an affirmative determination is made in step S301, the process proceeds to step S302. In step S302, on the basis of the relationship between the cetane number of the fuel and the threshold temperature Tf shown in FIG. 2, a value of the threshold temperature associated with the standard cetane number is set as the threshold temperature Tf. If a negative determination is made in step S301, the process proceeds to step S303. In step S303, it is determined whether or not a request for upward adjustment of the threshold temperature Tf is made. If an affirmative determination is made in step S303, the process proceeds to step S304, where a value of the threshold temperature adjusted to a higher temperature is set as the threshold temperature Tf in response to the request. The amount of change in the threshold temperature by this adjustment may be, for example, a predetermined value. After the above-described setting of the threshold temperature Tf is done, the request for upward adjustment of the threshold temperature is reset (or cancelled). If a negative determination is made in step S303, the process proceeds to step S305, where a value of the threshold temperature associated with the cetane number determined by the cetane number determination process in step S106 is set as the threshold temperature Tf on the basis of the relationship between the cetane number of the fuel and the threshold temperature Tf shown in FIG. 2.

As above, by performing the filter regeneration process shown in FIG. 4 with the threshold temperature Tf set by the threshold temperature setting process, the timing of the supply of fuel to the exhaust gas through the fuel supply valve 5 for raising the temperature of the filter 4 is adjusted appropriately. Basically, the threshold of the exhaust gas temperature at which the supply of fuel for the filter regeneration process is to be started is adjusted taking account of the volatility of fuel that is estimated from the cetane number of the fuel. Moreover, when there is a deviation from the relationship between the cetane number and the volatility that suggests insufficient volatility of fuel, the threshold of the exhaust gas temperature is changed to a higher temperature. Then, the fuel supplied to the exhaust gas in order to raise the temperature of the filter 4 will be supplied in an environment in which the fuel exhibits excellent volatility. Therefore, the supply of fuel can be performed at as low a temperature as possible without causing a deterioration of the activity of the oxidation catalyst 3 due to adhesion of supplied fuel to the oxidation catalyst 3. In consequence, the frequency of performing the filter regeneration process can be increased. The determination of the cetane number of fuel and setting of the threshold of the exhaust gas temperature corresponding to it are performed every time fuel is supplied to the fuel tank 30 of the internal combustion engine 1. Therefore, even if the volatility of the fuel used in the internal combustion engine 1 changes by refueling, the supply of fuel to the exhaust gas for the filter regeneration can be carried out appropriately.

Embodiment 2

Next filter regeneration control according to a second embodiment of the present disclosure will be described with reference to flow charts shown in FIGS. 6A and 6B. The processing steps in the filter regeneration control shown in FIGS. 6A and 6B that are the same as those in the filter regeneration control shown in FIG. 4 are denoted by the same reference signs and will not be described further. In the filter regeneration control according the second embodiment, the processing of the steps S207 and S208 in the filter regeneration control shown in FIG. 4 is replaced by the processing of steps S401 to S409 in FIG. 6B. Specifically, if an affirmative determination is made in step S206, the process proceeds to step S401.

In step S401, it is determined whether or not the air-fuel ratio of the exhaust gas flowing out of the oxidation catalyst 3 measured by the air-fuel ratio sensor 8 is higher than a specific air-fuel ratio Af0, namely whether or not this air-fuel ratio of the exhaust gas is leaner than the specific air-fuel ratio. The specific air-fuel ratio is an air-fuel ratio of the exhaust gas that is expected to be formed taking account of the supply of fuel to the exhaust gas through the fuel supply valve 5 by the filter regeneration process started in step S204, namely it is an air-fuel ratio of the exhaust gas associated with the filter regeneration process. As fuel is supplied by the fuel supply valve 5 for the filter regeneration process, the exhaust gas temperature is raised by the fuel, and with the addition of the supplied fuel to the exhaust gas, the air-fuel ratio of the exhaust gas is expected to change to a corresponding air-fuel ratio, which is the aforementioned specific air-fuel ratio Af0. However, if the fuel supply valve 5 is in some trouble, namely if a trouble prevents the fuel supply valve 5 from supplying a requested quantity of fuel in response to a fuel supply request from the ECU 20, the quantity of supplied fuel will be smaller than the requested quantity. Then, the quantity of heat generated in the oxidation catalyst 3 can be smaller, and the air-fuel ratio of the exhaust gas can be leaner. To detect this, the determination of step S401 is performed, whereby it is determined whether or not the supply of fuel by the fuel supply valve 5 is in trouble. If an affirmative determination is made in step S401, the process proceeds to step S402. If a negative determination is made, the process proceeds to step S407.

In step S402, since the air-fuel ratio of the exhaust gas flowing out of the oxidation catalyst 3 is leaner than the specific air-fuel ratio Af0, a fuel-increasing process of increasing the quantity of fuel supplied through the fuel supply valve 5 in the filter regeneration process is started. This fuel-increasing process is a process of making up the shortfall from the quantity intended to be supplied in the filter regeneration process by making the quantity of fuel supplied by the fuel supply valve 5 in the filter regeneration process larger than that in the case where the fuel-increasing process is not performed. After the completion of the processing of step S402, the process proceeds to step S403, where the heat quantity ΔTc generated in the oxidation catalyst 3 is calculated as in step S205 described above. Then, in step S404, it is determined whether or not the generated heat quantity ΔTc is smaller than a specific value Tc0 as in step S206. If an affirmative determination is made in step S404, the process proceeds to step S405. If a negative determination is made, the process proceeds to step S408.

If an affirmative determination is made in step S404, then it means that the quantity of fuel supplied by the fuel supply valve 5 is corrected to a proper quantity but the oxidation reaction of fuel in the oxidation catalyst 3 does not progress satisfactorily. Then, it is confirmed with higher reliability that the volatility of fuel is not sufficient at the time when the fuel is supplied. Therefore, if an affirmative determination is made in step S404 and the process proceeds to step S405, the filter regeneration process and the fuel-increasing process in progress are stopped. Thereafter, in step S406, a request for adjusting the threshold temperature Tf upward is made in order to ensure sufficient volatility of the fuel as in step S208.

If a negative determination is made in step S401, the process proceeds in step S407. In step S407, the filter regeneration process in progress is stopped as in step S207. If a negative determination is made in step S401, then it means that although the heating of the exhaust gas by the oxidation catalyst 3 is not achieved satisfactorily, the quantity of fuel supplied by the fuel supply valve 5 is appropriate for the heating of the exhaust gas. In this case, it can be considered that it is not necessary to perform the fuel-increasing process in step S402, and the supply of fuel is performed in a condition in which the volatility of fuel is insufficient. Therefore, if a negative determination is made in step S401, the filter regeneration process is stopped without performing the fuel-increasing process, and the processing of step S406 is performed additionally.

If a negative determination is made in step S404, then it means that an appropriate quantity of fuel is supplied thanks to the fuel-increasing process and the fuel exhibits sufficient volatility, so that the oxidation reaction of fuel in the oxidation catalyst 3 is carried out satisfactorily. Then, the process proceeds from step S404 to step S408. In this case, the filter regeneration process is performed while continuing the fuel-increasing process. In step S408, it is determined whether or not the filter regeneration process started in step S204 is to be terminated as in step S209. If an affirmative determination is made in step S408, the process proceeds to step S409, where the filter regeneration process and the fuel-increasing process is stopped. If a negative determination is made in step S408, the processing of step S408 is executed again.

As above, in the filter regeneration process according to the second embodiment, the upward adjustment of the threshold temperature Tf in terms of the exhaust gas temperature for starting the filter regeneration process is performed after checking the air-fuel ratio of the exhaust gas flowing out of the oxidation catalyst 3 and performing the fuel-increasing process. Thus, the upward adjustment of the threshold temperature Tf is performed after excluding the possibility of insufficient heating of the exhaust gas due to a trouble of the fuel supply valve 5. Therefore, the supply of fuel for the filter regeneration process can be performed at as low a temperature as possible, and the frequency of performing the filter regeneration process can be increased further.

Modification

In the filter regeneration control according to FIGS. 6A and 6B, the processing of steps S401 and S402 relating to the compensation of the quantity of fuel supplied through the fuel supply valve 5 is performed after the filter regeneration process is started and the determination as to whether heating of the exhaust gas by the oxidation catalyst 3 is satisfactory is made (i.e. the processing of step S206). Alternatively, the processing of steps S401 and S402 relating to the compensation of the quantity of fuel supplied through the fuel supply valve 5 may be performed after the filter regeneration process is started but before the determination as to whether heating of the exhaust gas by the oxidation catalyst 3 is satisfactory is made. In this case, the determination as to whether the heating of the exhaust gas by the oxidation catalyst 3 is appropriate (i.e. the processing of step S206 or S404) is made after confirming the absence of a trouble of the fuel supply valve 5 and compensation of the quantity of fuel supplied by the fuel supply valve 5.

Although the oxidation catalyst 3 and the filter 4 are provided separately in the exhaust gas purification system for the internal combustion engine 1 shown in FIG. 1, the oxidation catalyst 3 and the filter 4 may be integrated alternatively, namely the oxidation catalyst 3 may be supported on the filter 4. In that case, the temperature of the exhaust gas flowing into the oxidation catalyst 3 is the temperature of the exhaust gas flowing into the filter 4 on which the oxidation catalyst 3 is supported, and the air-fuel ratio of the exhaust gas flowing out of the oxidation catalyst 3 is the air-fuel ratio of the exhaust gas flowing out of the filter 4 on which the oxidation catalyst 3 is supported.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An exhaust gas purification system for an internal combustion engine comprising:
    a filter provided in an exhaust passage of the internal combustion engine to trap particulate matter in exhaust gas;
    an oxidation catalyst provided in said exhaust passage upstream of said filter or supported on said filter;
    a fuel supplier that is configured to supply fuel to the exhaust gas upstream of said oxidation catalyst; and a controller comprising at least one processor configured to:

determine, after fuel is supplied to a fuel tank of said internal combustion engine, a cetane number of said fuel used in the internal combustion engine after the supply of fuel; and perform a temperature raising process, which is a process of raising a temperature of said filter by heat of oxidation reaction of fuel in said oxidation catalyst, by supplying fuel to the exhaust gas through said fuel supplier when the temperature of the exhaust gas flowing into said oxidation catalyst exceeds a specific threshold temperature that is determined on the basis of the cetane number of the fuel, said threshold temperature being set lower when the cetane number of the fuel is low than when the cetane number of the fuel is high, wherein when a quantity of heat generated in said oxidation catalyst per unit time is smaller than a specific value while said temperature raising process is being performed, said controller suspends the temperature raising process in progress, and resumes said temperature raising process later on when the temperature of the exhaust gas flowing into said oxidation catalyst exceeds an updated threshold temperature higher than said specific threshold temperature.

2. The exhaust gas purification system for an internal combustion engine according to claim 1, wherein the controller is further configured to perform, when an air-fuel ratio of the exhaust gas to which fuel has been supplied by said fuel supplier is leaner than a specific air-fuel ratio associated with said temperature raising process while said temperature raising process is being performed, a fuel-increasing process which is a process of increasing a quantity of fuel supplied through said fuel supplier in said temperature raising process so as to make the air-fuel ratio of the exhaust gas equal to said specific air-fuel ratio, wherein when the quantity of heat generated in said oxidation catalyst per unit time is smaller than said specific value while said fuel-increasing process is being performed during said temperature raising process, said controller suspends the temperature raising process and the fuel-increasing process in progress, and resumes said temperature raising process later on when the temperature of the exhaust gas flowing into said oxidation catalyst exceeds said updated threshold temperature.

3. The exhaust gas purification system for an internal combustion engine according to claim 2, wherein when the quantity of heat generated in said oxidation catalyst per unit time is equal to or larger than said specific value while said fuel-increasing process is being performed during said temperature raising process, said controller continues the temperature raising process with the fuel-increasing process being performed.

* * * * *